United States Patent
Poplack et al.

(10) Patent No.: US 11,308,008 B1
(45) Date of Patent: Apr. 19, 2022

(54) SYSTEMS AND METHODS FOR HANDLING DPI MESSAGES OUTGOING FROM AN EMULATOR SYSTEM

(71) Applicant: CADENCE DESIGN SYSTEMS, INC., San Jose, CA (US)

(72) Inventors: Mitchell G. Poplack, San Jose, CA (US); Christian Wiencke, Campbell, CA (US); Bhoumik Shah, Newark, CA (US); Ping-Sheng Tseng, Saratoga, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/139,333

(22) Filed: Dec. 31, 2020

(51) Int. Cl.
    *G06F 13/16* (2006.01)
    *G06F 9/455* (2018.01)
    *G06F 13/28* (2006.01)

(52) U.S. Cl.
    CPC ...... *G06F 13/1668* (2013.01); *G06F 9/45508* (2013.01); *G06F 13/28* (2013.01)

(58) Field of Classification Search
    None
    See application file for complete search history.

(56) References Cited

U.S. PATENT DOCUMENTS

| | | | | |
|---|---|---|---|---|
| 6,075,938 A * | 6/2000 | Bugnion | ............... | G06F 9/544 703/27 |
| 7,613,847 B2 * | 11/2009 | Kjos | ............... | G06F 12/1081 710/22 |
| 8,146,107 B2 * | 3/2012 | Canton | ............... | G06F 9/45537 719/319 |
| 2011/0296411 A1 * | 12/2011 | Tang | ............... | G06F 9/45545 718/1 |
| 2012/0124572 A1 * | 5/2012 | Cunningham | ...... | G06F 9/45558 718/1 |
| 2021/0314303 A1 * | 10/2021 | Kittur | ............... | H04L 63/0281 |

* cited by examiner

*Primary Examiner* — Michael Sun
(74) *Attorney, Agent, or Firm* — Foley & Lardner LLP

(57) ABSTRACT

Embodiments described herein provide for an emulation system that supports efficiently generating outgoing messages to a test bench. The emulation system transmits the outgoing messages to the test bench various busses and interfaces. The compiled virtual logic writes the outgoing messages into memories of the emulation chips for queuing, and notification messages associated with the queued outgoing messages. A traffic processor transfers from memories to the test bench using buses and interfaces. The traffic processor reads a notification message from memory to identify the storage location with a corresponding queued outgoing message. The traffic processor then transmits DMA requests to I/O components (e.g., DMA engines) to instruct the I/O components to transfer the queued outgoing message to the host device.

20 Claims, 13 Drawing Sheets

SYSTEMS AND METHODS FOR HANDLING DPI MESSAGES OUTGOING FROM AN EMULATOR SYSTEM

TECHNICAL FIELD

This application generally relates to systems and methods handling communications between an emulator system and test bench software executed by a host system. In particular, embodiments generally relate to emulator components that efficiently generate and transfer outgoing messages generated during emulation of virtual logic.

BACKGROUND

Manufacturing integrated circuits (ICs) or other logic system is expensive, rendering testing and verification efforts for new logic system designs cost-prohibitive or cost inefficient. Emulation systems offer a much less expensive and more reliable way of verifying the design prior to actually producing the logic system. Emulation systems comprise hardware logic components, including emulation chips with emulation processors, for processor-based (i.e., hardware-based). By executing various forms of programmable logic on the processor-based emulation chips, the emulation chips may be designed to mimic the functionality of nearly any IC or other logic system design that is undergoing testing.

Such hardware emulation systems may include hundreds or thousands of emulation processors that collectively emulate the functionality of the logic system design under test (DUT). In many cases, these emulation processors include reprogrammable application-specific ICs (ASICs) that function synchronously according to one or more system clocks. The emulation chips may comprise hardware components, such as processors, capable of processor-based (e.g., hardware-based) emulation of logic systems, such as ASICs, to test the capabilities of the new design. These processor-based emulators sequentially evaluate combinatorial logic levels, starting at the inputs and proceeding to the outputs. Each pass through the entire set of logic levels and instructions is a "cycle" and the evaluation of each individual logic level is an emulation "step."

The emulation processors are generally arranged into groups of processors known as "clusters." Each emulation processor performs an identical set of functions, such as retrieving data from a memory, evaluating the data, and writing the processed result back into either the same or different memory. Emulation processors typically address the memory via an instruction word. The instruction word is stored in an instruction memory and contains a read address for the data to be evaluated and a Boolean function table that instructs the processor on how to evaluate the data. The emulation processor then stores the produced result back to the same memory location as indicated by the instruction address.

A computing device in communication with the emulator system executes test bench software that manages and observes the operations of the emulator. During execution, the emulator can report certain information about the virtual logic and related execution using Direct Programming Interface (DPI) messages, where DPI is the software routine mechanism for making calls from the Verilog code of the emulator into the test bench or sending programmatic instructions into the emulator from the test bench. For example, the Verilog code of design may include a "display" command to output information to the test bench. When the emulator arrives at that command during execution, the emulator must generate and transmit DPI messages out of the emulator, to the test bench. DPI frameworks of the designs are becoming more common, so designers require emulators to include robust testing capabilities. Similarly, the verification requirements covering DPI ports and other parts of increasingly more complex designs are growing more stringent.

This growth in DPI expectations demands improved DPI messaging capabilities for designers to have more insight into the designs. Conventional emulators have difficulty handling large numbers of DPIs messages. For example, in order to generate and output DPI messages to the test bench, conventional emulators needed many additional multiplexers (MUXs) and memories, each of which required additional logic. These additional components consume resources and clock cycles, resulting in inefficiencies and generally lower performance. What is needed is a way for emulator systems that can more efficiently combine and upload DPI messages (or other types of messages) to a test bench.

SUMMARY

Disclosed herein are systems and methods capable of addressing the above-described shortcomings and may also provide any number of additional or alternative benefits and advantages. Embodiments described herein provide for an emulator system that more efficiently combines and uploads small or large numbers of DPI messages. The emulator system includes emulation chips, emulation processors, internal memories of the emulation chips, traffic processors, and DMA engines, among other components. The emulator processors generate and output outgoing messages (e.g., DPI messages) via DPI ports of virtual logic. An internal memory of an emulation chip stores/queues the outgoing messages. Another internal memory of the emulation chip stores/queues notification messages that indicate the storage locations containing the outgoing messages and which emulation cycle generated each outgoing message. The traffic processor is configured to detect a notification message, and instruct a DMA engine (e.g., ISB/PCI controller) to pull the outgoing message from the memory location indicated by the notification message and forward the outgoing message to the host system as PCI packets over a PCI bus and/or other communication link and formats. The DMA engine is configured to conduct internal data transfers (e.g., data writes) and/or external transfers (e.g., PCI communication).

The emulation system described herein supports efficiently generating outgoing messages to a test bench. The emulation system transmits the outgoing messages to the test bench various busses and interfaces. The compiled virtual logic writes the outgoing messages into memories of the emulation chips for queuing, and notification messages associated with the queued outgoing messages. A traffic processor controls transfers from memories to busses and interfaces to the test bench. The traffic processor reads a notification message from memory to identify the storage location with a corresponding queued outgoing message. The traffic processor then transmits direct memory access (DMA) requests to I/O components instructing the I/O components to transfer the queued outgoing message to the host device.

In an embodiment, a method for handling outgoing messages from an emulator executing virtual logic in which the method comprises generating, by an emulator, one or more outgoing messages for a host device according to virtual logic; storing, by the emulator, the one or more outgoing messages into a memory of one or more memories; identifying, by the emulator, a memory location of the memory containing an outgoing message; and transmitting, by the emulator, the outgoing message at the memory location to the host device.

In another embodiment, an emulator processor comprises a plurality of emulation processors, one or more memories, and a traffic processor. The emulation processors are configured to execute virtual logic of a compiled design; and generate one or more outgoing messages for a host device according to virtual logic. A memory is configured to store the one or more outgoing messages generated by the plurality of emulation processors. And the traffic processor is configured to identify a memory location of the memory containing an outgoing message according to a notification message; and transmit the outgoing message to the host device.

It should be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
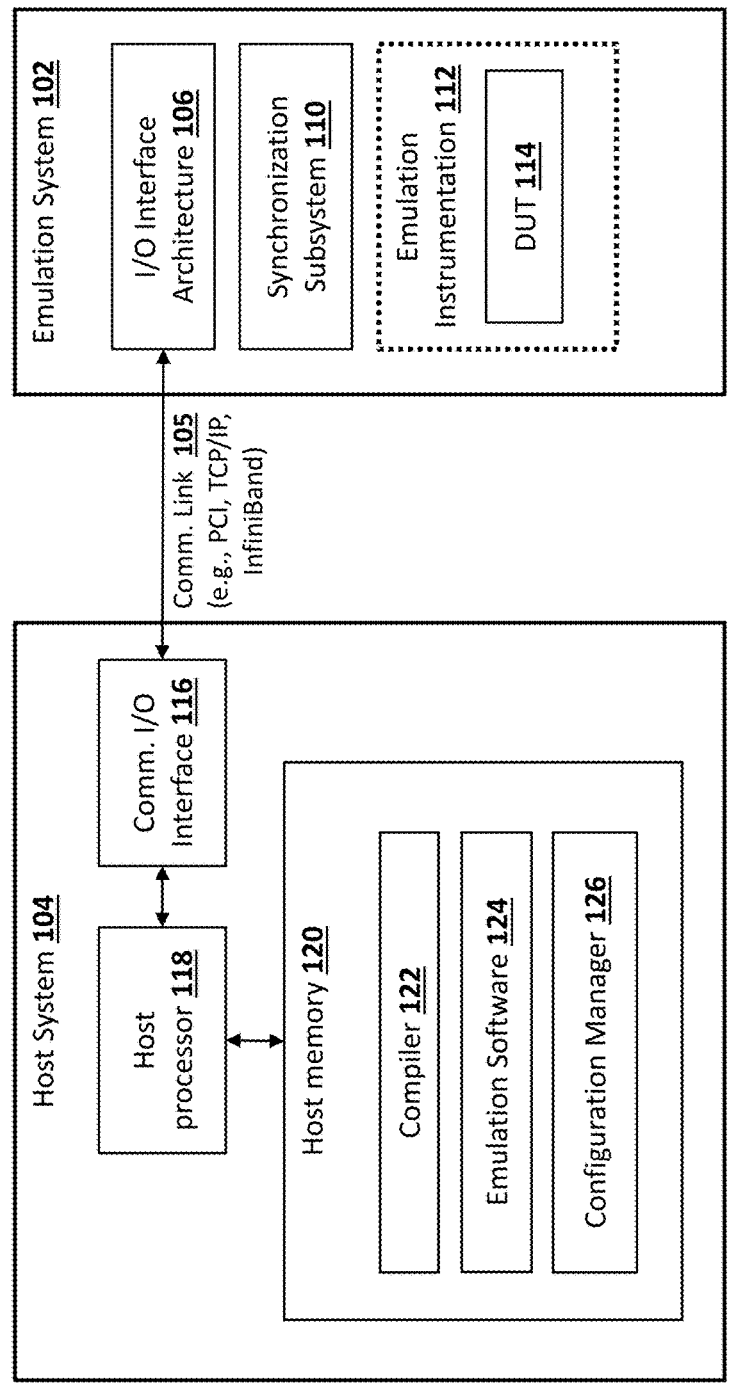
FIGS. 1A-1I show components of a system for transferring outgoing messages from an emulation system to a host system, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments described herein provide for memory structures, virtual logic, embedded processors, DMA engines, and software processes of an emulation system that supports efficiently generating outgoing messages into a data stream for one or more host devices. The host devices execute software that operate as a test bench associated with the emulation system, performing various operations such as managing emulation operations, co-simulation operations, and/or post-analysis of emulation operations. The emulation system transmits or uploads the outgoing messages to the host device through a communication link through one or more interfaces. The virtual logic compiled for the design and executed by the emulation system generates the outgoing messages according to instructions in the virtual logic or instructions received from the test bench. The virtual logic includes DPI ports that output or write the outgoing messages into internal memories of the emulation chips for queuing the outgoing messages. The virtual logic also generates notification messages associated with the queued outgoing messages stored in the internal memories.

The emulation chip includes a traffic processor that is separate from the emulation processors performing the design emulation. The traffic processor controls data transfers from the internal memories of the emulation chip to interfaces and busses of the emulation system, which includes instances of uploading the outgoing messages to the test bench. When the traffic processor detects a particular notification message, the traffic processor reads the notification message from the internal memory to identify the storage location containing the corresponding queued outgoing message. The traffic processor then transmits DMA requests to I/O components (e.g., DMA engines) to instruct the I/O components to transfer the queued outgoing message to the host device.

Emulation System and Host System

FIGS. 1A-1I show components of a system 100 for efficient delivery of outgoing messages (e.g., DPI messages) from an emulation system 102, via one or more communication links 105, to a host system 104 executing software (sometimes called a "test bench") for managing operations of the emulation system 102.

FIG. 1A is a block diagram showing components of the host system 104 and the emulation system 102, which are in communication with each other via the communication link 105. The communication link 105 comprises any number of computing hardware and software components establishing a bus or link between computing devices using any number of communication protocols. In operation, the communication link 105 conducts data and/or instruction transfer between the host system 104 and the emulation system 102. Non-limiting examples of the communication link 105 include Peripheral Component Interconnect (PCI), which may include PCI express (PCIe), TCP/IP, and InfiniBand, among other types of communication links 105.

Host System

The host system 104 may be any computing device comprising a host processor 118, a host memory 120, and one or more communication I/O interfaces 116. The host system 104 may further include any number of support circuits, such as cache memory, power supply, clock circuits, data registers, and the like. The host processor 118 of the host system 104 may include circuitry configured to execute the various processes and tasks described herein. Non-limiting examples of the host processor 118 of the host system 104 may include an x86 central processing unit (CPU), an ARM processor, a Reduced Instruction Set Computing (RISC) processor, an ASIC processor, or a Complex Instruction Set Computing (CISC) processor, among others.

The host memory 120 of the host system 104 may store various forms of software programs and files for execution by the host processor 118, such as an operating system (OS) and emulation software 124. The emulation software 124 includes as a compiler 122 and/or a configuration manager 126. The host memory 120 implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

The communication I/O interface 116 couples the host memory 120 or the host processor 118 to the emulation system 102. The communication I/O interface 116 manages and/or interprets communications with the emulation system 102 over the communication link 105. The communication I/O interface 116 or other support circuit may also receive inputs from user interface devices (e.g., keyboard, mouse) for the OS of the host system 102, informing the OS to, for example, generate an interactive graphical user interface (GUI) to output on a monitor an interactive display configured to receive user inputs from the various user interface devices.

The compiler 122 comprises software configured to convert a hardware design netlist file (e.g., hardware described in a hardware description language (HDL)) into a sequence of processor-executable instructions that can be evaluated by a hardware emulator, executed by the emulation system 102. The compiler 122 may be executed on any number of devices, such as the host system 104 or emulation system 102 shown in FIG. 1A, or another device. The compiler 122 may be a software module component of design or emulation software 124, which may be executed by the host system 104 or emulation system 102; or the compiler 122 may be a standalone software application configured to compile a design file, such as a netlist file.

In operation, the compiler 122 receives and compiles the netlist design file containing design elements into virtual logic of the compiled design, such as the logic gates, of the IC design currently being designed and tested (shown as DUT 114). The compiler 122 generates a virtual logic file (representing the IC's logic) based on the compiled netlist. The compiler 122 maps or otherwise associates the IC's logic and timing of operations into the hardware components of the emulation system 102, according to the design of the IC. The compiler 122 generates machine-readable instructions for the components of the emulation system 102 that cause the mapped components of the emulation system 102 to function as the DUT 114. The compiler 122 or other aspect of the test bench can generate and inject additional processor-executed instructions that manage or control various aspects of the emulation system 102. For example, in addition to the compiled design logic, the virtual logic can also include administrative or overhead instructions related to timing, synchronization, memory management, data transfers, and the like.

The compiler 122 may include a partitioner component and a scheduler component, though it should be appreciated that the compiler 122 may be segmented into any number of discrete component software modules. In an opening import phase, the compiler 122 receives a netlist and then begins compiling the netlist. Here, the compiler 122 parses the logic gates of the netlist into a database format. The partitioner determines which part of the netlist is going to be executed by which hardware resource of the emulation system 102. Then, the scheduler determines which of the hardware resources should execute the resulting instructions generated for each particular part of the netlist. The scheduler may also determine when in the execution lifecycle the virtual logic represented by the netlist should be executed.

The emulation software 124 tracks the status, and controls the performance, of components of the emulation system 102. The emulation software 124 may determine which components of the emulation system 102 are available or unavailable to receive parts of the virtual logic generated by the compiler 122. In some cases, the emulation software 124 continuously polls or self-tests the emulation system 102 for faulty hardware components. In some cases, the emulation software 124 may determine the status of components of the emulation system 102 when the virtual logic is being loaded into the hardware components of the emulation system 102. The designer can use the emulation software 124 to issue queries or instructions to the emulation system 102, such as requesting design-related information at certain points during the execution or instructing the emulation system 102 to execute from a certain breakpoint or for a certain number of steps/cycles.

A configuration manager 126 component of the emulation software 124 tracks the status of compiled instructions and controls the execution of instructions by components of the emulation system 102. The configuration manager 126 may determine which components of the emulation system 102 are available or unavailable to receive parts of the virtual logic generated by the compiler 122. In some cases, the configuration manager 126 continuously polls or self-tests the emulation system 102 for faulty hardware components, and may track the availability of various components of the emulation system 102.

The various software modules 122, 124, 126 may be executed in whole or in part on the host system 104, such as an administrator or IC designer's workstation computer, and configured to communicate data associated with the respective software module 122, 124, 126 to and from the emulation system 102. For example, in some cases, the host system 104 may execute the compiler 122 module that allows a user to input a netlist design file, containing logic gate designs of the prototype ASIC, and then compiles the netlist file. The resulting virtual logic generated by the host system 104 may then be transmitted or otherwise downloaded to the emulation system 102. In this example, the emulation system 102 may execute the configuration manager 126 that tracks the availability of resources within the emulation system 102.

Emulation System

The emulation system 102 comprises an I/O interface architecture 106, a synchronization subsystem 110, and emulation instrumentation 112, which are logical aspects of the emulation system 102 comprising various hardware and/or software components of the emulation system 102. It should be appreciated that such logical aspects are mentioned for ease of description and understanding and are not necessarily boundaries or strictly defined sets of components.

The I/O interface architecture 106 comprises hardware components for managing communications among components of the system 100. This subsystem provides a number of functions including, for example, providing the PCI interface 136 (or other types of interfaces for the communication link 105), communicating runtime communication (e.g., emulation job download, configuration, runtime control), and exchanging various types of design data, among other potential functions. The interface architecture 106 comprises an Internal System Bus (ISB) which allows transfer of data internally between targets like block register interfaces and internal and external memories, back and forth with the I/O Buffers (IOBs) and ultimately PCIe. The interface architecture 106 includes the computational resources to manage the flow of traffic over the PCIe. The interface architecture 106 also includes asynchronous (not synchronized with the system clock) computational resources to perform additional manipulation or data transfers.

The synchronization subsystem 110 is a logical collection of hardware and/or software components responsible for maintaining synchronization and controlling execution timing of components of the emulation system 104. At runtime, the emulation system 102 uses the communication link 105 to download design data, configures the synchronization logic, and initializes or uploads any design memories to the test bench as instructed. Configuration and control of the synchronization system 110 is done over Infiniband to a data processing unit (DPU) and/or to the respective FPGAs, which may include timing-control interface (TCI 131) FPGAs situated on each of the emulation boards.

The emulation instrumentation 112 comprises hardware components (and sometimes software) for executing the virtual logic of the DUT 114, transferring design and/or control data between components, and managing the execution. The emulation instrumentation 112 may include an emulation engine configured to be a programmable device used in the verification of hardware design of DUT 114. The emulation instrumentation 112 may test and verify the operation of the DUT 114, an entire board of ICs, or an entire system, without having to actually, physically fabricate the hardware. The emulation instrumentation 112 generally comprises any number of racks with any number of emulation boards, organized logically into any number of board clusters. Each emulation board comprises one or more emulation chips 130, such as an ASIC. The emulation chip 130 comprises several reprogrammable emulation processors, often organized logically into any number of processor clusters 132. The emulation processors mimic the logic gates (or other logic/devices) of the DUT 114. The emulation system 102 may include any number of programmable logic devices (PLDs), such as field-programmable gate arrays (FPGAs), to perform or manage aspects of the emulation. Such devices may be coupled to an expansion board or other printed circuit board for communication via a bus or link, such as a PCI (or PCIe) bus or serial bus.

The emulation system 102 may further comprise an instructional database (not shown) and a resource index database (not shown). The instruction database may store records of virtual logic or instruction sets compiled by the compiler 122 from netlist files. The instruction database may be hosted in non-transitory machine-readable storage medium of any computing device capable of hosting the instruction database and performing the various tasks and processes associated with the instruction database, as described herein. The instruction database may receive, from the compiler 122, instructions compiled from the netlist file of the IC being tested (e.g., DUT 114). In some cases, the instructions may be contained within a virtual logic file generated by the compiler 122. At download time, the hardware components of the emulation system 102, such as the instruction memories of the processors, are loaded with the compiled instructions.

Emulation Chip

Figure 1B:
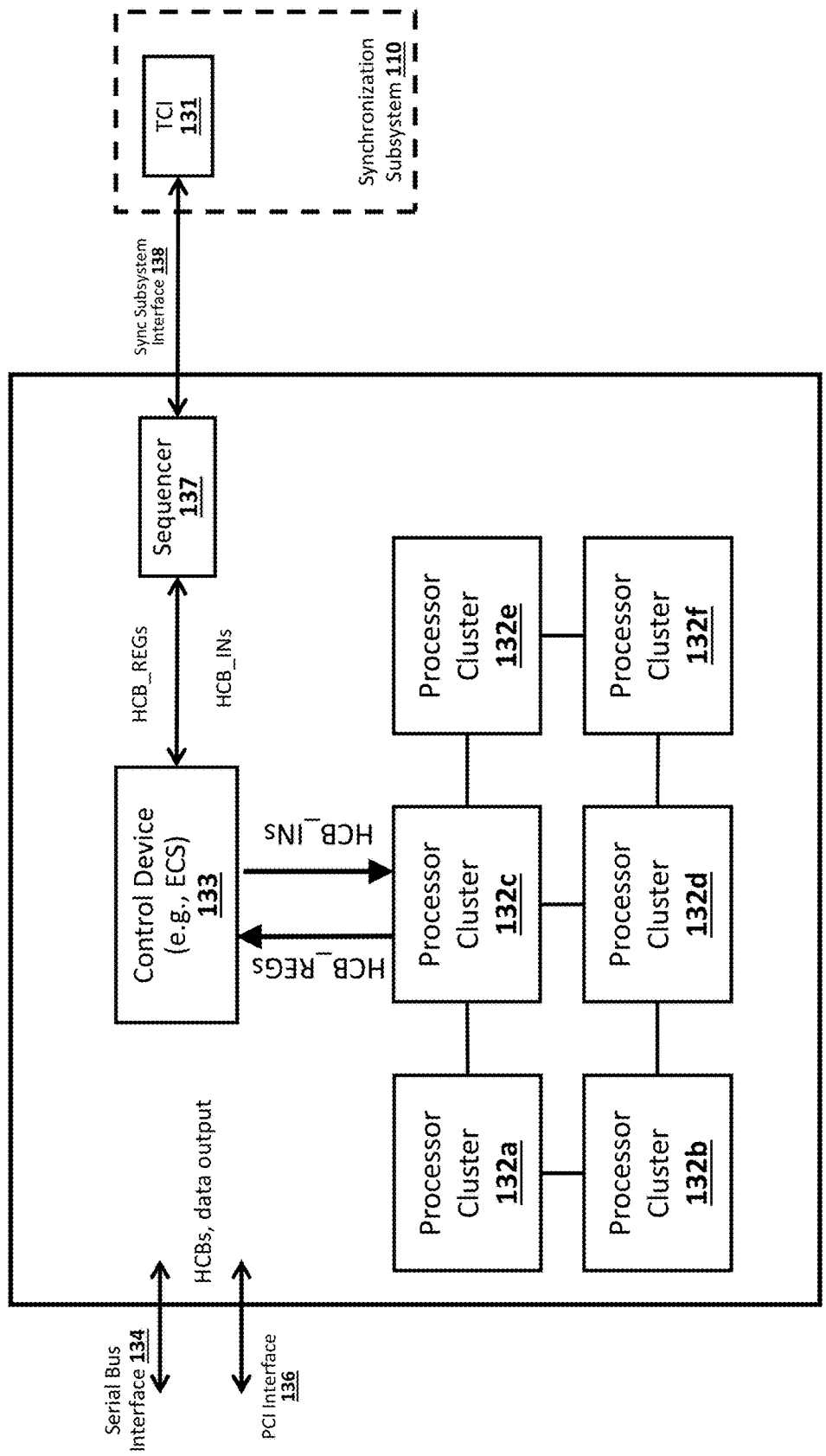

FIG. 1B is a block diagram showing components of the emulation chip 130 of the emulation instrumentation 112. The emulation chip 130 includes processor clusters 132a-132f, each of which includes one or more emulation processors for executing the logical operations of the DUT 114. The emulation chip 130 further includes interfaces 134, 136, 138 with other components of the emulation system 102, allowing the emulation system 102 to move data around the components of the system 100. The interfaces 134, 136, 138 of the example emulation chip 130 include the serial bus interface 134, the PCI interface 136, and the synchronization subsystem interface 138. The emulation chip 130 further includes a sequencer 137.

The PCI interface 136 (or PCIe interface) is the primary interface for runtime communications, diagnostics, and management communications with the host system 104, which includes transmitting DPI messages to the host system 104. The PCI interface 136 is used for downloading the design to the components of the emulation chips 130 (or other components of the emulation system 102) and transmitting data containing information about the emulation performance or management. For example, the PCI 136 can carry configuration instructions for a serializer-deserializer (SERDES) component of the serial bus interface 134. Additional, non-limiting examples of communications conducted through the PCI interface 136 may include trace data uploads to the host system 104; runtime operation instructions, such as emulation operations (clocking, querying signals, depositing and forcing values); and dynamic netlist operations (e.g., reconfiguring probes, breakpoints), among others.

The synchronization subsystem interface 138 includes one or more buses that conduct signals between the synchronization subsystem 110 and various components of the emulation system 102. In many instances, the sequencers 137 of the emulation chip 130 communicate with the synchronization subsystem 110 via the synchronization subsystem interface 138. The sequencers 137, for example, receive clock step or cycle ("DSTEP") pulses and/or execution instructions from the synchronization subsystem 110, causing the sequencers 137 to instruct the emulation processors of the emulation chip 130 to perform one or more emulation cycles. As another example, the emulation chip 130 transmits a status indicator to the components of the synchronization subsystem 110, indicating whether the emulation chip 130 resources (e.g., emulation processors) are ready to proceed with executing the next emulation cycles.

The serial bus interface 134 transmits design data between emulation chips 130. The emulation chips 130 may be on the same board or on another board in the same board cluster. The serial bus 134 conducts data transfers between these emulation chips 130. The serial bus 134 may also transmit design data between emulation chips 130 on another board in different clusters in the same rack-pair (via optics), to emulation chips 130 in another rack-pair (via optics), among other destinations.

Memory Structures for DPI Messaging

Figure 1C:
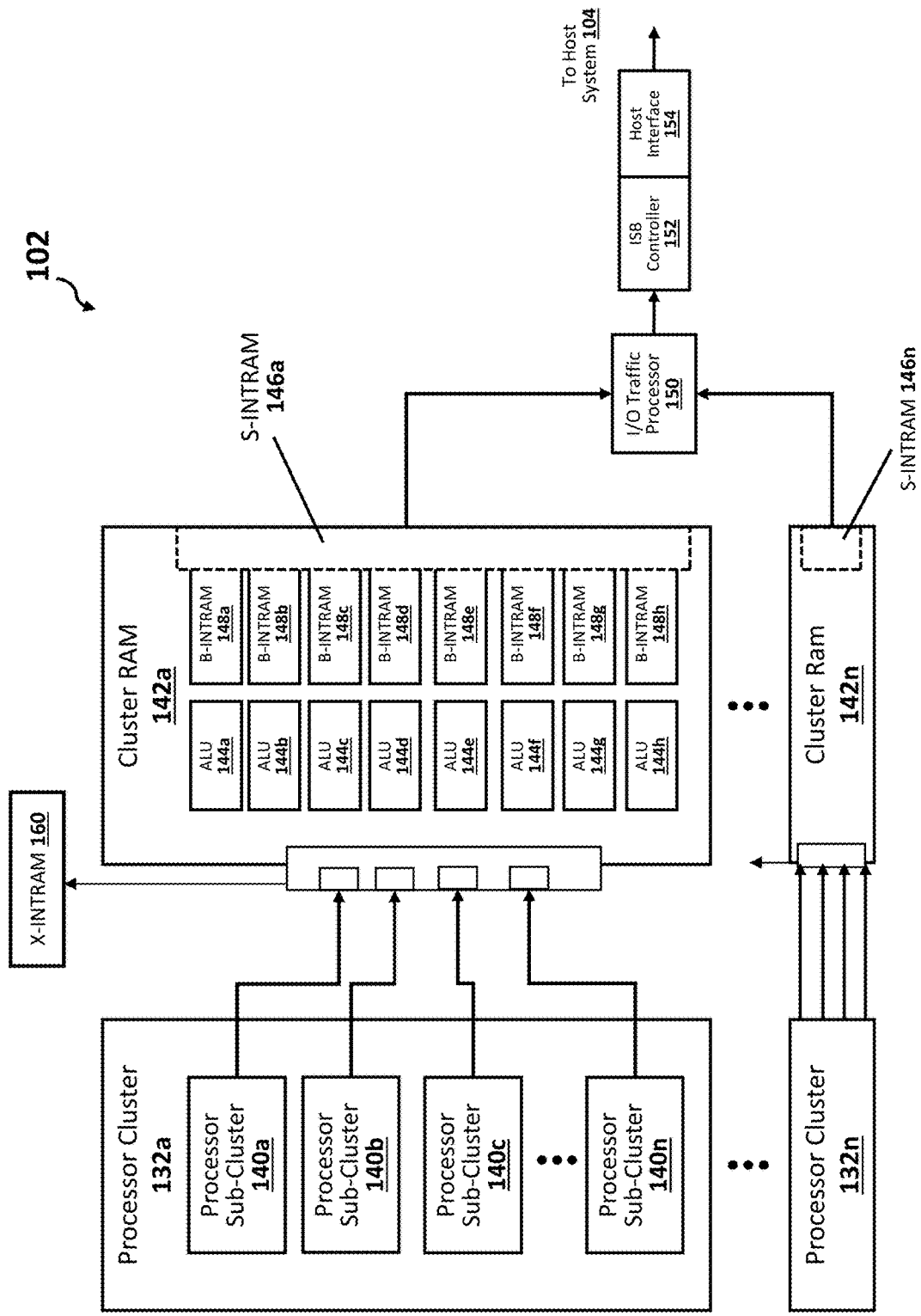

FIG. 1C is a block diagram showing memory components of emulation chips 130 and the interface architecture 106 of the emulation system 102. The processor clusters 132a-132n transmit data (e.g., DPI messages, doorbells) to corresponding cluster memory locations, including cluster RAMs 142a-142n and an XINTRAM 160, a RAM associated with an I/O traffic processor 150. The cluster RAM 142a-142n and the XINTRAM 160 transmit the data to the I/O traffic processor 150 that assembles and processes the data in the cluster memory locations and transmits data (e.g., assembled DPI messages) to the host system 104.

The emulation processors are organized logically into clusters at various hierarchical levels, for structural and physical reasons and to take advantage of locality of reference. As such, the processor clusters 132a-132n include any number of processor sub-clusters 140a-140n. The partitioner of the compiler 122 analyzes the netlist at all levels and partitions the netlist into the various hierarchical levels with the goal of optimizing performance and minimizing communications between components of the emulation system 102.

The sub-clusters 140a-140n communicate data (e.g., outgoing DPI messages) to cluster RAMs 142a-142n corresponding to the processor clusters 132a-132n. The cluster RAMs 142a-142n structures contain one or more types of internal memory (INTRAMs) of the emulation chips 130a-130f, which are fast local memory locations. The INTRAMs are divided into two segments of physical memories: block INTRAMs (BINTRAMs 148a-148h) and shallow INTRAMs (SINTRAMs 146a-146h). These INTRAMS could be employed interchangeably for normal INTRAM operation. The BINTRAM 148a-148h comprises physical memories that, for example, are 8k Dx(64+8) W and the SINTRAMs 146a-146n include physical memories that are, for example, 256 Dx(64+8) W, where the SINTRAMs 146a-146h are employed when the memory needs are shallow but very wide, such that the resources of the BINTRAMs 148a-148h are not consumed in a way that could hinder efficient use of memory.

The processor clusters 132a-132n further communicate data (e.g., doorbell notification messages) to one or more internal memories (XINTRAMs 160) coupled to an I/O traffic processer 150, which is another type of internal memory configured for the traffic processor 150. The XINTRAMs 160 include a tightly coupled shared memory between the virtual logic and the traffic processor 150, one or more processor clusters 132a-132n will have access to this shared memory.

The cluster RAMs 142a-142n comprise arithmetic logic unit (ALU) blocks (ALUs 144a-144h), which are computational assist logic units that perform operations on data that might otherwise cause inefficiencies to bust into gates of the physical memories. The ALUs 144a-144h are capable of a wide range of 64-bit integer operations. The ALUs 144a-144h may, for example, assist floating point operations, such as collections of arithmetic and trigonometric functions, as well as conversion to and from integer representations. In the example embodiment, there are eight ALUs 144a-144h per processor cluster 132a-132n, arranged similarly to the SINTRAMs 146a-146n. The ALUs 144a-144h need not store instructions to maintain efficiencies. The ALUs 144a-144h are accessed through memory access busses, so accesses to a particular ALU 144a (including the selection of which operation to perform), are encoded to look like memory operations. The ALUs 144a-144h also contain a set of local registers to store temporary values so that data is not constantly being exchanged through the busses.

The emulation chip 130 includes a PCI interface 136 and controller, which connect may connect the emulation chip 130 to a host interface block (HIF 154). The HIF 154 sends and receives PCI packets and interacts with a number of I/O slices, which are logical collections of I/O related devices (e.g., ISB switches, I/O traffic processors 150). These slices can operate independently, allowing multiple overlapping transfers or operations, such transfers between different processes interacting with different resources. Each I/O slice receives temporary possession of logically independent ISBs by sending instructions to the ISB controller 152. For example, the ISB controller 152 permits one traffic processor 150 to receive data from the particular cluster RAM 142a, while another traffic processor 150 transmits data to the host system 104.

The traffic processor 150 manages data traffic with the PCI bus or other communications bus of the emulator system 102. In operation, the traffic processor 150 observes the properties of each PCI header as each data packet arrives and determines the sequence of operations to perform accordingly. The traffic processor 150 processing power and capabilities can vary according to the needs of the embodiment. In some cases, the traffic processor 150 is powerful enough to perform significant processing but have reduced memory and omit certain processing features. In some cases, the traffic processor 150 could be more robust. For example, the traffic processor 150 is configured to perform various algorithmic or processing operations, such as functions typically performed by a floating point unit (FPU). In some implementations, the traffic processor 150 accesses the shared memory (e.g., memory location shared by traffic processor 150 and emulation chip 130) of the XINTRAM 160, which allows the traffic processor 150 to interact quickly and directly with the virtual logic.

Figure 1D:
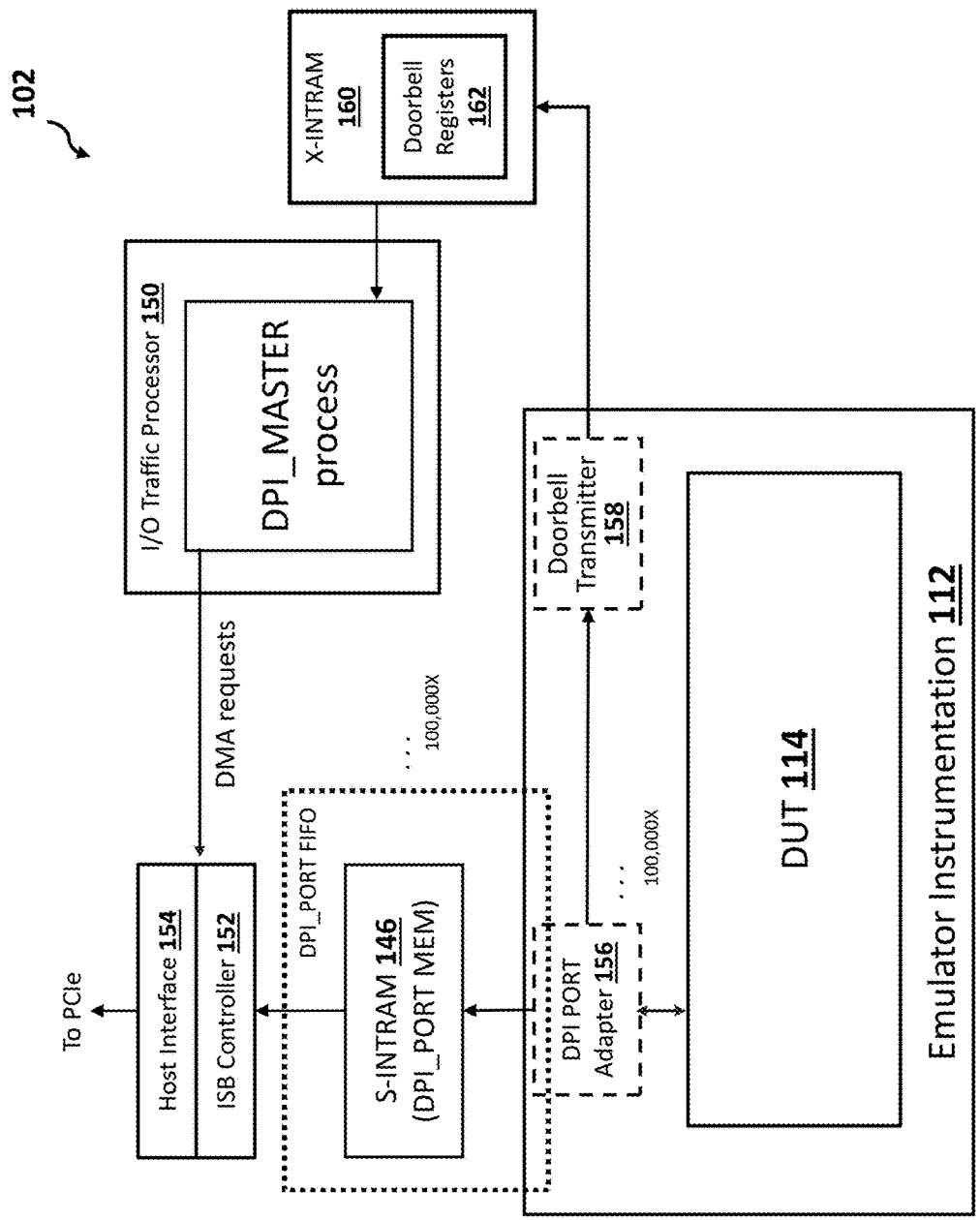

FIG. 1D is a block diagram showing the components of the emulation system 102 for generating and outputting the outgoing messages (e.g., DPI messages) to the host system 104. The emulator instrumentation 112 executes the virtual logic that generates the outgoing messages for transmission or upload to the host system 104. The emulation processors of the emulator instrumentation 112 generate the outgoing messages in response to, for example, a predefined instruction (e.g., breakpoint) of the virtual logic of the DUT 114 or an instruction received by the emulator system 102 from the host system 104.

In operation, the processor clusters 132a-132n communicate the outgoing messages to the SINTRAMs 146a-146n of the corresponding cluster RAMs 142a-142n. Portions of the virtual logic (executed by the processor clusters 132a-132n) represent DPI ports 157a-157f (FIG. 1G) and generate the outgoing messages that are outputted through one or more of the DPI ports 157a-157f. The virtual logic includes DPI port adapters 156 that write the outgoing message data from the DPI ports 157a-157f into corresponding SINTRAMs 146a-146n. Each SINTRAM 146a-146n serves as a memory for the corresponding DPI port 157a-157f (DPI_PORT_MEM). These memory locations, in turn, function as a message queue, which is sometimes referred to as a "FIFO" memory queue (DPI_PORT_FIFO) for the outgoing messages.

The DPI ports 157a-157f also output, via the DPI port adapter 156, a set of one or more bits indicating that the corresponding first-in-first-out (FIFO) memory queue is not empty, referred to as "doorbell bits." A doorbell transmitter 158 includes virtual logic that assembles the doorbell bits produced by the DPI ports 157a-157f into a single data write called a "doorbell." The doorbell is a notification message indicating to other components of the emulation system 102 that the outgoing message was written to the FIFO and containing information about the outgoing message. The doorbell transmitter 158 writes the doorbells into doorbell registers 162 of the XINTRAM 160.

The traffic processor 150 executes a process for handling outgoing messages (DPI_MASTER process). The traffic processor 150 continuously polls the doorbell registers 162 processes the doorbells. The traffic processor 150 iterates through the doorbell registers 162 to identify the next occupied doorbell register 162. When the traffic processor 150 detects the doorbell, the traffic processor 150 reads the information from the doorbell, which indicates the memory location of the outgoing message associated with the doorbell. The traffic processor 150 instructs issues a DMA request to the ISB controller 152 and the HIF 154.

Components of the interface architecture 106 function as DMA circuits, sometimes called "DMA engines," that allow various hardware subsystems to access (e.g., read, write) memory locations of the emulation system 102, but without disrupting or requiring operations of any processors (e.g., emulation processors, traffic processors 150). For example, a traffic processor 150 instructs a DMA engine, which may be the ISB controller 152 or (other type of memory controller or bus controller), to perform the data transfer. The traffic processor 150 proceeds with other operations. In some implementations, one or more DMA engines (e.g., ISB controllers 152) facilitate memory-to-memory reads/writes in response to instructions from the traffic processor 150 or offloaded from the traffic processor 150 to the DMA engines. The traffic processor 150 issues DMA requests to the DMA engine that issue outgoing message data writes to the IOB or other memory locations for upload to the test bench of the host system 104. The ISB controllers 152 (e.g., DMA engines) allow the traffic processor 150 to perform the data transfers (e.g., read/write outgoing DPI messages, read/write doorbells) over an internal system bus into the I/O buffer (JOB) and/or other internal memory locations (e.g., SINTRAM 146, XINTRAM 160). The traffic processor 150 or DMA engine (e.g., ISB controllers 152) instructs the HIF 154 (e.g., the host communication PCI) to transfer the data from a message queue memory to the host system 104, in response to the DMA requests from the traffic processor 150.

Figure 1E:
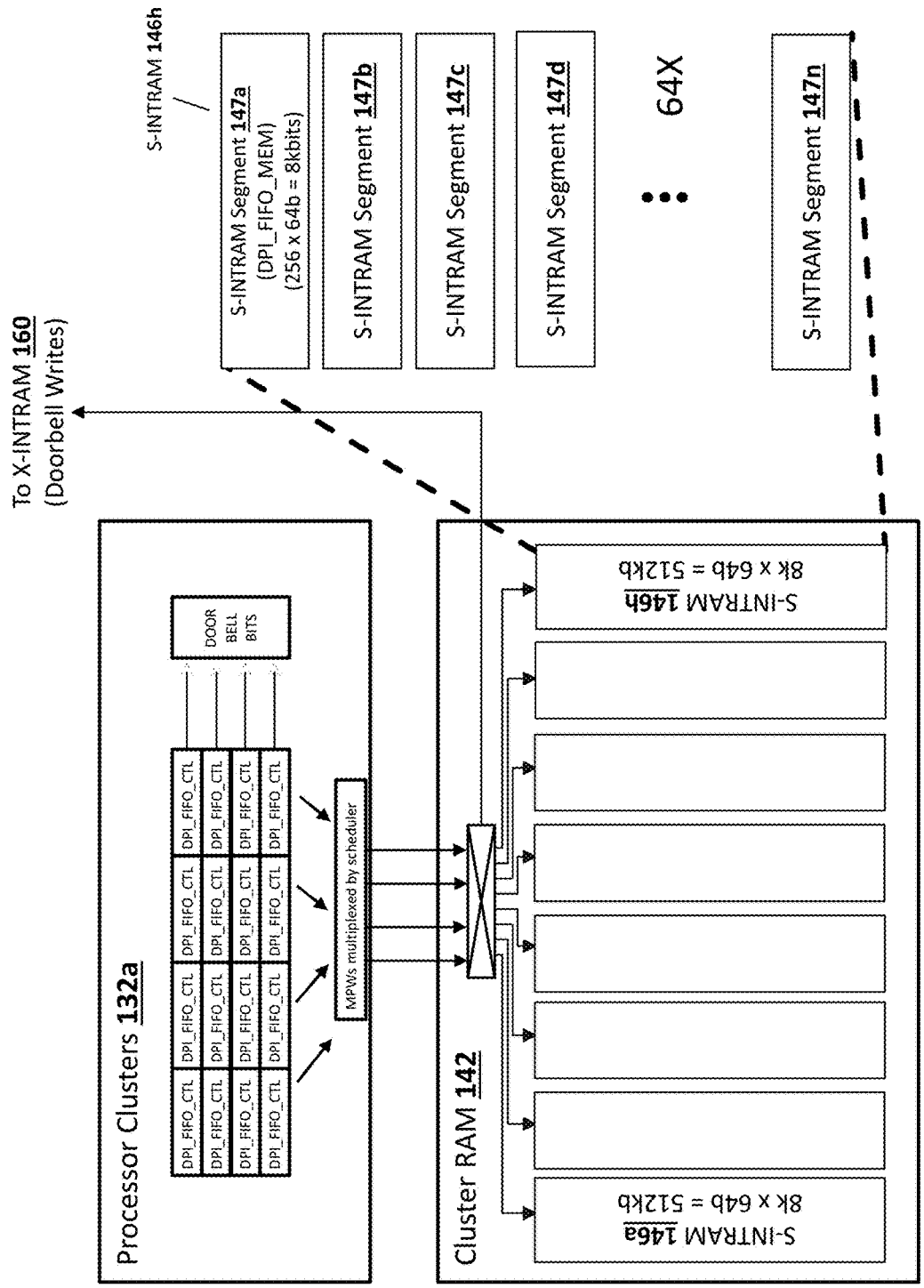

FIG. 1E is a block diagram showing the components of a particular processor cluster 132a and the corresponding cluster RAM 142a. When generating an outgoing message, the processor cluster 132a writes portions of the message into the SINTRAM 146a-146h locations (using the DPI port adapter 156) and, in some implementations, avoids using the ALUs 144a-144h and/or BINTRAMs 148a-148h. Each SINTRAM 146a-146n is logically segmented into segments 147a-147h (e.g., 64×8 kb), each for a message queue (DPI_FIFO) (e.g., message width of 1 kb). In some cases, the segments 147a-147h are consolidated if, for example, the size of the DPI ports 157a-157f is very wide and/or requires more FIFO depth, the segments 147a-147h are parsed out to ease scheduling the writes.

When the emulator instrumentation 112 prepares the outgoing messages, the SINTRAMs 146a-146h function as a DPI port memory structure (DPI_PORT_MEM) for the DPI ports 157a-157f and the segments 147a-147h function as the message queue or buffer (DPI_FIFO_MEM) of a message memory structure (DPI_FIFO_MEM). The purpose of the DPI_FIFO_MEM (e.g., segments 147a-147h) is to hold a message for a brief period until transmission or upload to the host system 104. The segments 147a-147h include multiple entries for holding enough messages only until the emulation system 102 has a chance to stall certain processes in order to maintain synchronization. Stalling may be required when, for example, outgoing uploads do not keep pace with the rate of new messages, which may be received every cycle. The emulation system 102 schedules a write for every 64 bits the message might contain, though messages can be of variable length. The emulation system 102 uploads only the used buffer entries.

Figure 1F:
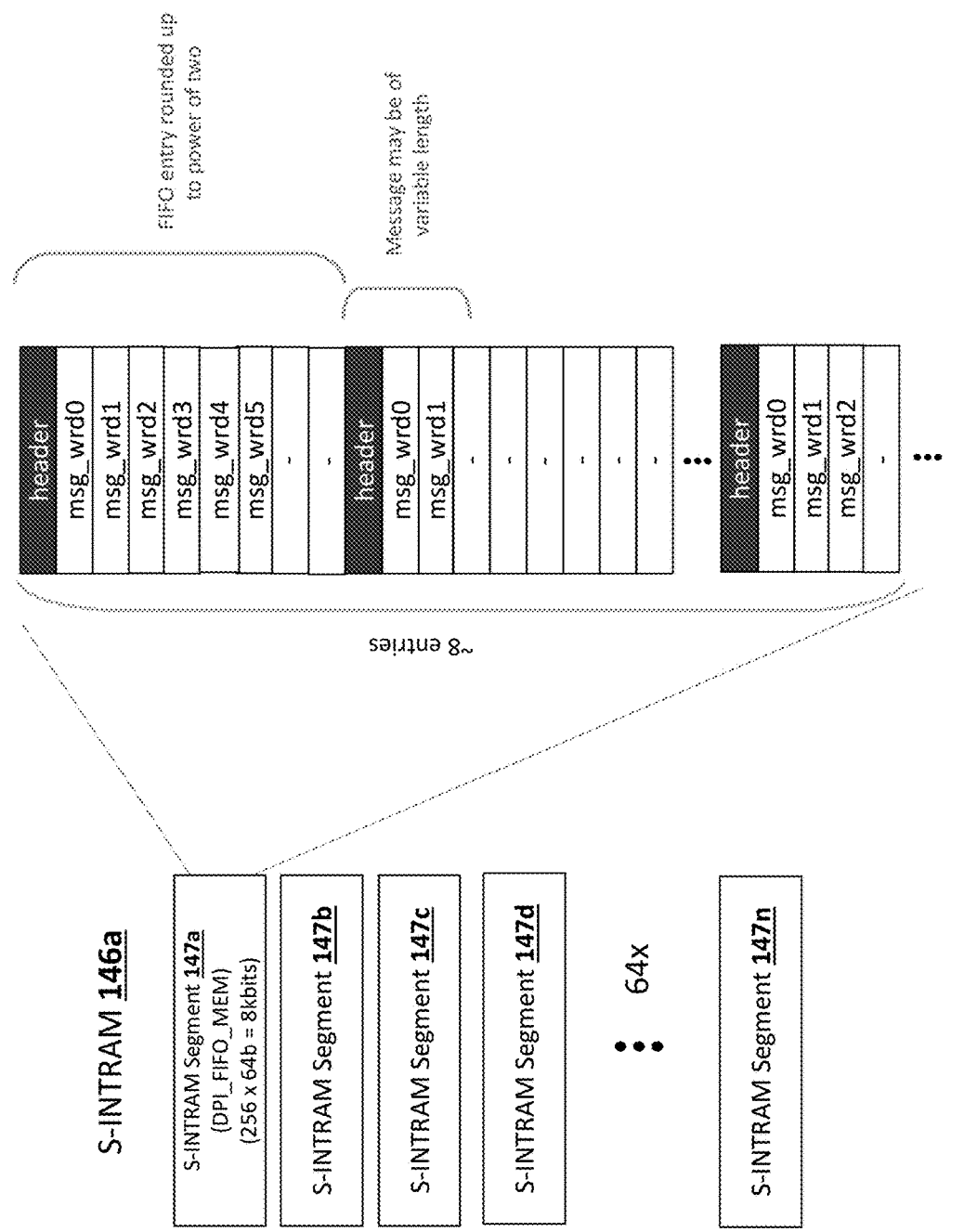

FIG. 1F shows the segments 147a-147h of a particular SINTRAM 146a, as well the entries of a particular segment 147a. The entries may be empty or contain message data, where the message data is header data or message words. The messages could vary in length, so empty entries are included between the last word of one message and the header of another message in order to maintain a safe distance between consecutive messages.

Figure 1G:
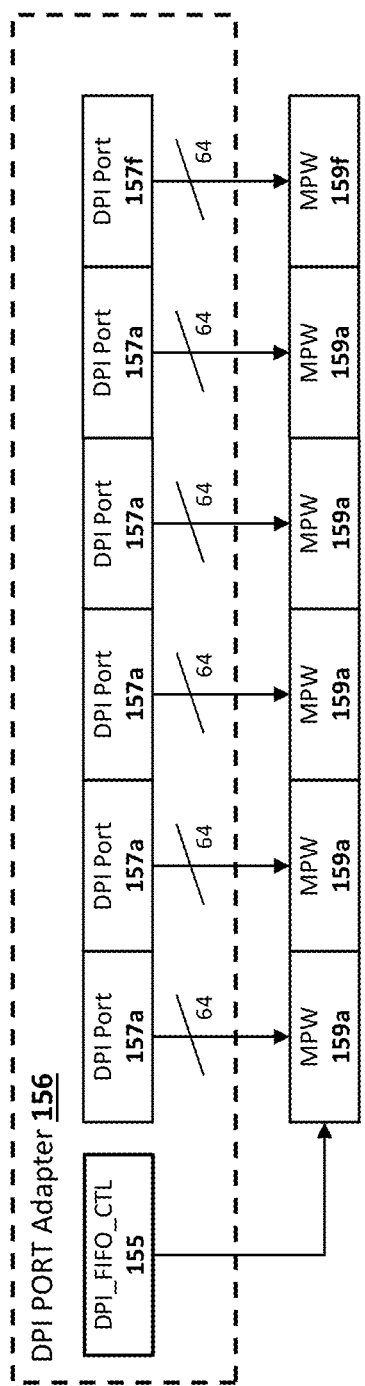

FIG. 1G is a block diagram showing components of the DPI port adapter 156 of the virtual logic executed by the processor clusters 132a-132n. The DPI port adapter 156 handles the outgoing message data sent via the DPI ports 157a-157f to the cluster RAM 142a (e.g., SINTRAMs 146a-146h, XINTRAM 160). The port adapter 156 includes one or more adapter controller 155 (DPI_FIFO_CTL) that manage writes of message data from the DPI ports 157a-157f (DPI_PORT) to the cluster RAM 142a-142n via one or more write memory ports (MPWs 159a-159f). The MPWs 159a-159f are part of the virtual logic generated by the compiler 122 to represent memory write ports, where the compiler 122 represents each memory write port as an MPW 159a-159f. In operation, the adapter controller 155 schedules a 64-bit write for every 64 bits of the outgoing DPI message data that arrives at a particular DPI port 157a.

The adapter controller 155 (with reference to FIG. 1E) instruct the DPI ports 157a-157f to write the doorbell bits into the doorbell transmitter 158, where the doorbell transmitter 158 or other component of the emulation system 102 assembles the doorbell bits into a doorbell and write the doorbell into the XINTRAM 160. This results in few additional writes, because there is one write per 64 DPI ports 157a-157f, whereas there is already one write scheduled for each 64 bits of message data. For example, if there are 64 DPI ports 157a-157f, and a message size of 192b in this particular processor cluster 132a, the emulation system 102 schedules 192 writes to the SINTRAM 146 and only one write to the XINTRAM 160. Ideally, the doorbell write occurs as soon as possible after the write into the particular DPI port 157a. In some cases, the emulation system 102 may want to write a new doorbell multiple times in the same system clock cycle (FCLK) to reduce latency. For example, the emulation system 102 may perform a doorbell write every 100 steps to keep the latency down to about 100 ns.

Traffic Processor, Doorbell Register, and I/O Slices

Figure 1H:
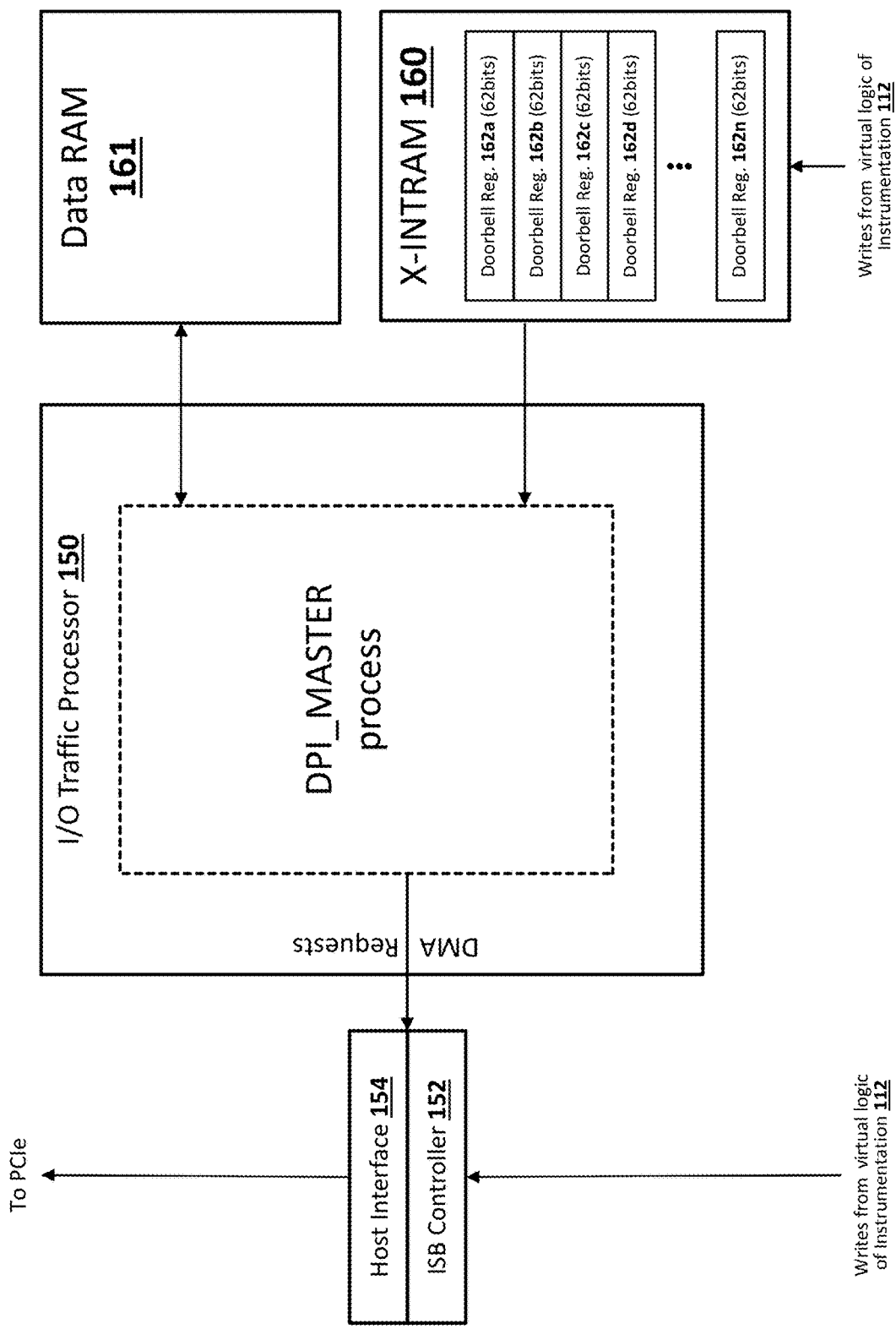

FIG. 1H is a block diagram showing components associated with the traffic processor 150, including the XINTRAM 160 and a data RAM 161 for the traffic processor 150. The XINTRAM and the data RAM 161 are tightly coupled memories with the traffic processor, which the traffic processor 150 can access 64 bits every step. The traffic processor 150, for example, accesses the XINTRAM 160 to poll the doorbell registers 162 and detect whether one of the DPI ports 157 contains pending outgoing message data. If there are 16k DPI ports 157 in the particular emulation chip 130a, then the traffic processor 150 will take an average of 128 ns to notice a particular DPI port 157a has data, as indicated in the XINTRAM 160. In some embodiments, to increase reaction time, the virtual logic generates summary bits that inform the traffic processor 150 of which set of doorbell registers 162 to search.

Figure 1I:
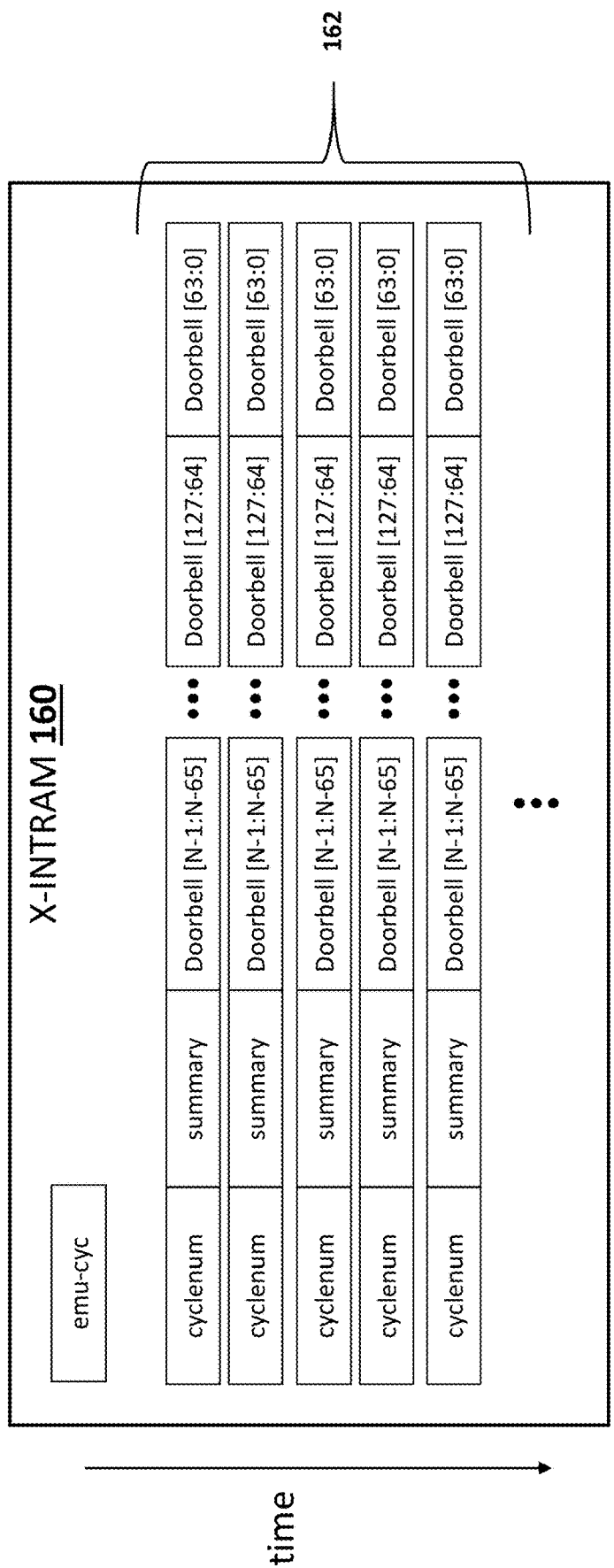

FIG. 1I is a block diagram showing the doorbell registers 162 of the XINTRAM 160. In operation, after the traffic processor 150 completes an upload, the traffic processor 150 checks a cycle number register (cur_cyclenum) to confirm the current cycle of the emulation system 102. If the traffic processor 150 is getting too far ahead of the processed doorbells, then the traffic processor 150 (or other component of the emulation system 102) must stall operations (e.g., executing a FAST_PAUSE and UNPAUSE functions). When the traffic processor 150 completes the known uploads, the traffic processor 150 quickly scans through the entries of the doorbell registers 162 to identify any outgoing messages issued for earlier cycles. For example, the traffic processor 150 scans through the summary words for a given cycle to determine whether any DPI messages issued to the XINTRAM 260 for that cycle. If so, then the traffic processor 150 then scans through the doorbell bits to process the upload. These operations are part of the DPI master process (DPI_MASTER) of the traffic processor 150.

Data Processing Unit (DPU)

Figure 2:
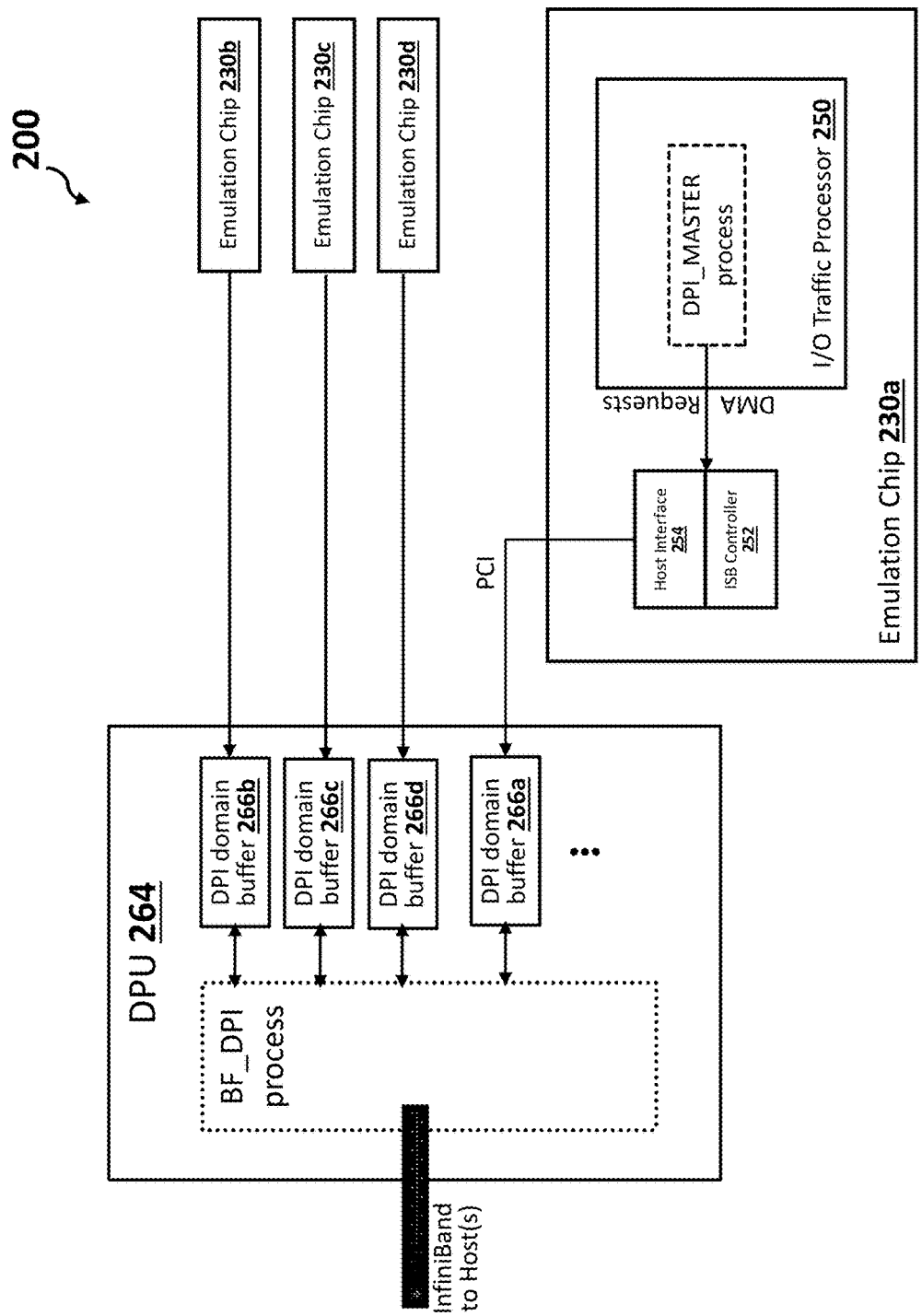
FIG. 2 shows components of an emulation system for managing outgoing messages to a host system, according to an embodiment.

FIG. 2 shows components of an emulation system 200 for managing outgoing messages to a host system. The emulation system 200 comprises any number of emulation chips 230a-230d configured to execute virtual logic of a DUT and transmit the outgoing messages to the host system in response to certain instructions or at certain intervals. The emulation system 200 further comprises a data processing unit (DPU 264) that receives outgoing messages from the emulation chips 230a-230b, assembles an outgoing host message from the outgoing messages, and transmits the host message to the system host via a communication link (e.g., InfiniBand, PCI, TCP/IP). The DPU 264 is any programmable electronic device capable of processing streams of data from the emulation chips 230a-230d. Non-limiting examples a DPU may include Bluefield® or Fungible®. It should be appreciated that embodiments are not limited to the DPU 264 mentioned herein, but may include any number of additional or alternative processing units (e.g., CPU, GPU, ALU).

The DPU 264 includes buffer memories (DPI domain buffers 366a-366d) corresponding to the emulation chips 230a-230d. The buffer memories 266a-266d store outgoing messages received from the corresponding emulation chips 230a-230d. Each emulation chip 230a-230d executes a DPI_MASTER process that, in part, detects outgoing message data in a message queue and pushes the outgoing message data from the message queue into the corresponding buffer memories 266a-266d.

The DPU 264 executes a DPI handling process (BF_DPI) that cycles through the buffer memories 266a-266d to detect when new messages are present. When the DPI detects a new message in a particular buffer memory 266a, the DPU 264 pushes the new message into a host memory or (otherwise transmits the new message to the host system) as appropriate. Occasionally, the DPU 264 writes into a register of the traffic processor 250 a status update that indicates to the traffic processor 250 of the particular emulation chip 230a that the corresponding buffer memory 266a is full or nearly full.

Emulation Chip and Multiple I/O Slices

Figure 3:
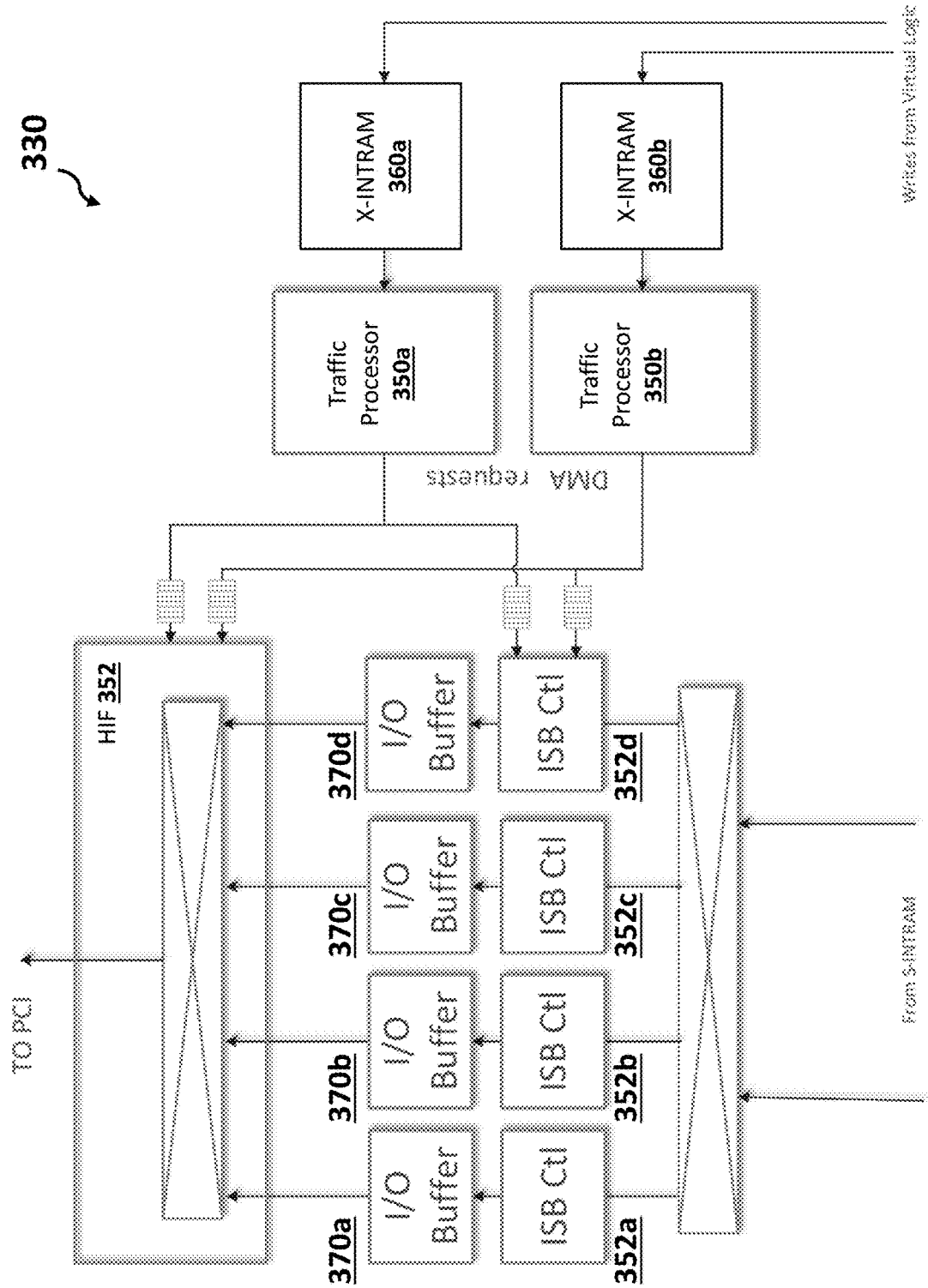
FIG. 3 shows components of an emulation chip of an emulation system, according to an embodiment.

FIG. 3 shows components of an emulation chip 330 of an emulation system, where the components of the emulation chip 330 are divided logically into separate portions that operate independently from one another. The components of the emulation chip 330, for example, is divided into two halves that each operate on one-half of the virtual logic. The emulation chip 330 comprises two traffic processors 350a-350b and two XINTRAMS 360a-360b corresponding to the traffic processors 350a-350b. The traffic processors 350a-350b use four I/O slices (e.g., ISB controllers 352a-352d, I/O buffers 370a-370d) to master control over PCI transactions for sending outgoing messages to a host device. Each traffic processor 350a-350b instructs the ISB controllers 352a-352d to permit data transfers from the SINTRAMs of the emulation chip 330 to the I/O buffers 370a-370d. The two traffic processors 350a-350b issue DMA requests to the four ISB controllers 352a-352d that permit the SINTRAM (not shown) to write (or otherwise transfer) queued outgoing message data into the four I/O buffers 370a-370d. The two traffic processors 350a-350b instruct an HIF 352 to write (or otherwise transfer) the outgoing message data to the host system or DPU via a PCI bus when one or more of the I/O buffers 370a-370d reaches a certain amount of data.

The two traffic processors 350a-350b poll doorbell registers of the respective XINTRAMS 360a-360b to detect queued doorbell notifications. The two traffic processors 350a-350b maintain awareness of the cycle numbers of the emulation system according to a register in each of the XINTRAMS 360a-360b that indicates the current cycle number. The doorbells indicate the cycle number that the virtual logic generated a particular doorbell (and the corresponding outgoing message stored in the SINTRAM). The two traffic processors 350a-350b and other components of the emulation system reference the cycle numbers of the doorbells and outgoing messages to maintain proposer sequencing/chronology of the outgoing messages, allowing the emulation system to process and deliver the outgoing messages in proper order.

The example emulation chip 330 of FIG. 3 shows the two traffic processors 350a-350b, though embodiments are not so limited. It should be appreciated that embodiments of embodiments of emulation chips 330 (or other components of such emulation systems) may comprise any number of traffic processors 350. Likewise, emulation systems may comprise any number traffic processors 350.

Example Data Flow

Figure 4:
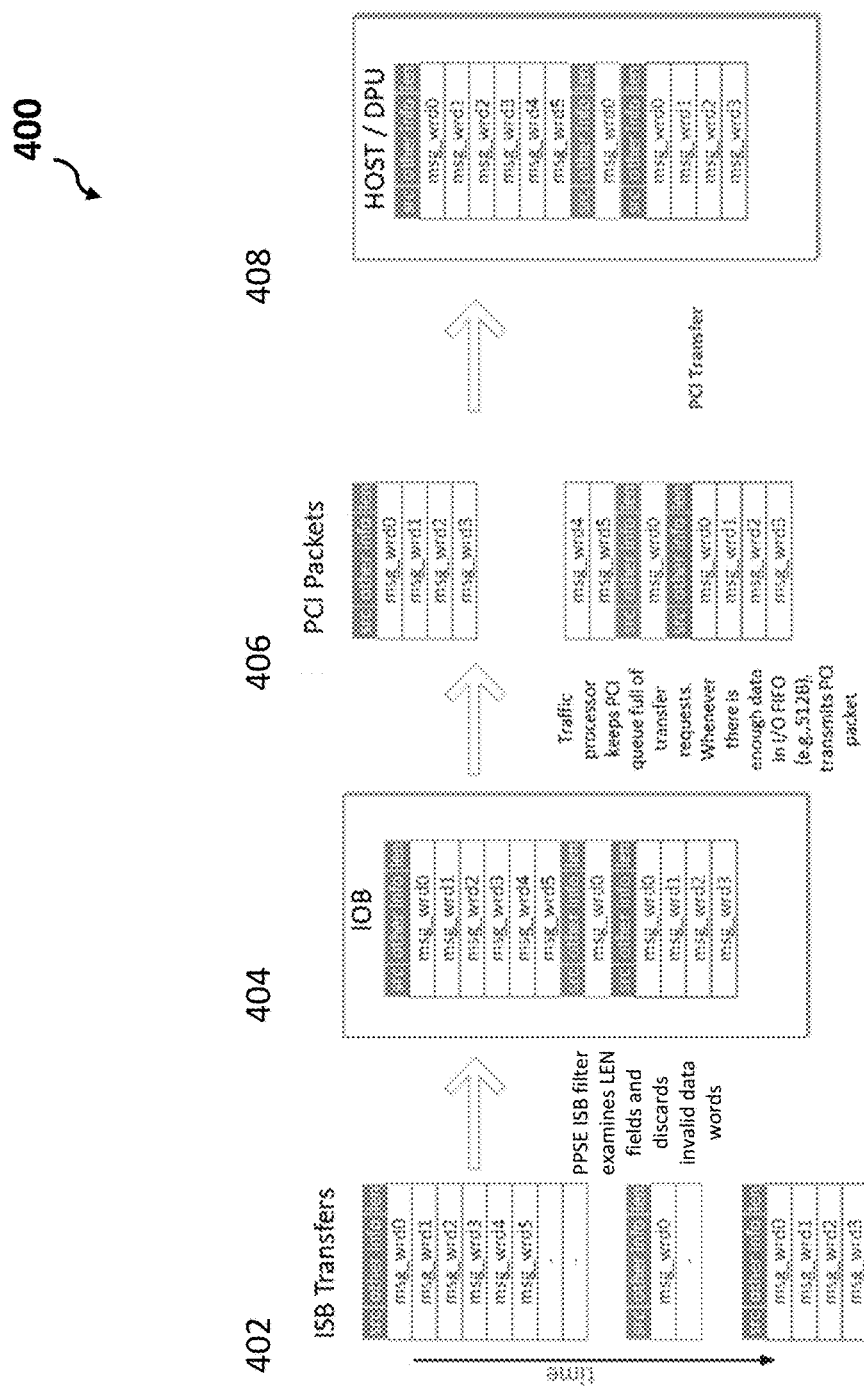
FIG. 4 shows data flow of a process for transmitting DPI messages to a host system, according to an embodiment.

FIG. 4 shows message data flow among components of emulation system during an example process 400 for transmitting DPI messages to a host system.

In step 402, a traffic processor issues DMA requests to an I/O slice comprising an ISB controller to initiate data transfers of messages stored in SINTRAMs. In step 404, the ISB controller transfers a set of three outgoing messages from, for example, three segments of a particular SINTRAM to an I/O buffer (JOB) of the I/O slice. In some embodiments, the outgoing messages are assembled into one or more outgoing host messages, where the outgoing messages contain portions of the outgoing host message.

In an optional implementation, the data transfer of step 402 includes variable length messages. The ISB controller, in step 404, examines a length field (LEN) (or other form of length information that indicates the length of the words and/or the length of the outgoing message) of the header (e.g., the first word) of each outgoing message. Based upon the length information (e.g., LEN) of the header of the outgoing message, the ISB controller determines whether the outgoing message has a length that exceeds a threshold length. Where the length information of the header indicates that the outgoing message has a length that exceeds the threshold length, the ISB controller removes one or more portions of the outgoing message based upon and in accordance with the threshold length by writing only the necessary portion (e.g., message words) of the outgoing message into the JOB.

In step 406, the traffic processor determines whether the IOB contains a certain amount of outgoing messages are queued for transfer to the host system. In step 408, after determining that the IOB is full or otherwise reached a threshold amount of data (in step 406), the traffic processer then instructs the DMA engine controlling the I/O slice (e.g., ISB controller) to transmit the outgoing messages from the IOB to the host system via the PCI bus or other communication link.

In some embodiments, the emulation system comprises a DPU that performs various processes on outgoing messages received from one or more emulation chips. The DPU receives the outgoing messages, via the PCI bus, at domain buffers corresponding to the emulation chips or processor clusters. The DPU then transmits the outgoing messages, via the PCI bus or other communication link, to the host system.

The DPU sequentially transmits the outgoing messages to the host system so that the host system receives the outgoing messages in a meaningful order. The DPU may also, for example, assemble the outgoing messages into an outgoing host message, where the outgoing messages from one or more emulation chips contain only portions of the outgoing host message.

Alternative Example of DPI Port Adapter

Figure 5:
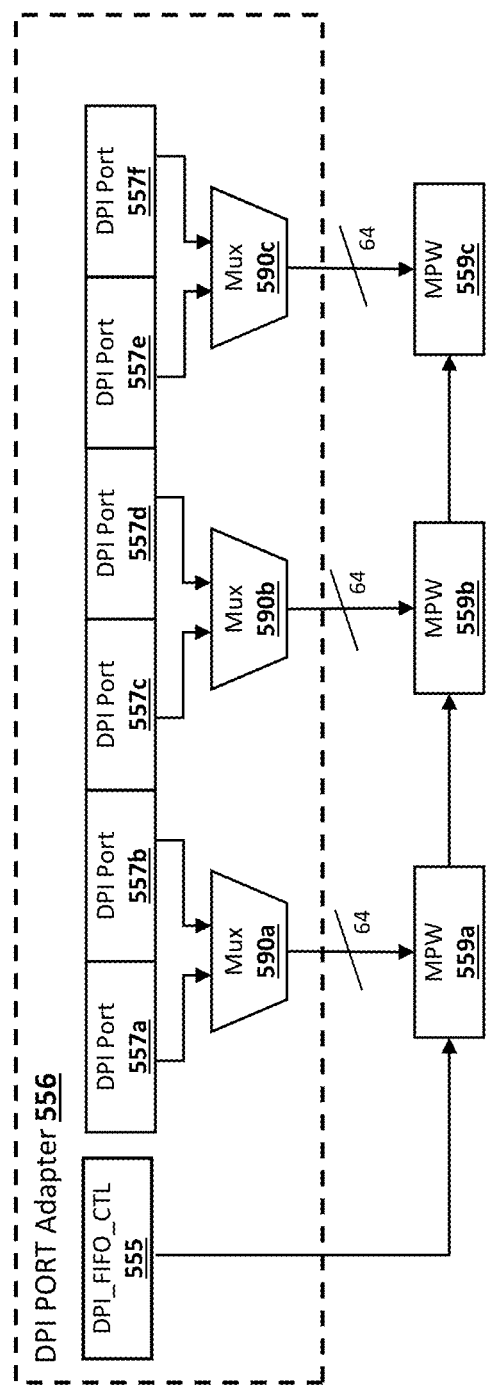
FIG. 5 is a block diagram showing components of a DPI port adapter of virtual logic executed by one or more processor clusters, according to an embodiment.

FIG. 5 is a block diagram showing components of a DPI port adapter 556 of virtual logic executed by one or more processor clusters 532. The DPI port adapter 556 handles outgoing message data outputted by DPI ports 557a-557f to cluster RAM (e.g., SINTRAMs, XINTRAM). The port adapter 556 includes an adapter controller 555 (DPI_FIFO_CTL) that manages writes of the outgoing message data from the DPI ports 557a-557f (DPI_PORT) to the cluster RAM via one or more MPWs 559a-559c. Pairs of the DPI ports 557a-557f transfer data to the MPWs 559a-559c via multiplexers (MUXs 590a-590c) that, in turn, forward the data to the MPWs 559a-559c on behalf of the DPI ports 557a-557f. In operation, the adapter controller 155 schedules a 64-bit write for every 64 bits of the outgoing DPI message data that arrives at a particular DPI port 557a. In some embodiments, like that of FIG. 5, it is not necessary to accept outgoing message data from DPI ports 557a-557f on every clock cycle. For efficient memory use, the port adapter 556 comprises the MUXs 590a-590c that multiplex writes from the DPI ports 557a-557f into comparatively fewer MPWs 559a-559c. Alternatively, in some embodiments, the DPI ports 557a-557f could be grouped together with virtual FIFOs built from flop devices, allowing for a larger number of DPI ports 557a-557f.

The adapter controller 155 instructs the DPI ports 557a-557f to write the doorbell bits into the doorbell transmitter, where the doorbell transmitter or other component of the emulation system assembles the doorbell bits into a doorbell and write the doorbell into the XINTRAM. This results in few additional writes, because there is one write per 64 DPI ports, whereas there is already one write scheduled for each 64 bits of message data. For example, if there are 64 DPI ports 557a-557f, and a message size of 192b in this particular processor cluster, the emulation system schedules 192 writes to the SINTRAM and only one write to the XINTRAM. Ideally, the doorbell write occurs as soon as possible after the write from the particular DPI port 557a. In some cases, the emulation system may want to write a new doorbell multiple times in the same system clock cycle (FCLK) to reduce latency. For example, the emulation system may perform a doorbell write every 100 steps to keep the latency down to about 100 ns.

Optional Combined Messages

As mentioned, in some embodiments, an emulation system comprises components that combine smaller outgoing messages into amalgamated outgoing host messages (sometimes referred to as "amalgamated messages"), resulting in fewer overall messages delivered to a host system. The logic for combining the outgoing messages may be found in various components.

In some implementations, a DPU includes buffers that receive the outgoing messages from multiple processor clusters and/or emulation chips. The DPU assembles the outgoing messages stored in multiple buffers to generate the outgoing amalgamated message. The DPU then transmits the outgoing amalgamated message to the host system after generating the outgoing host message.

In some implementations, the amalgamated message is generated by the virtual logic when transmitting the outgoing messages generated by the virtual logic. This not only produces fewer outgoing messages, but also requires fewer doorbell writes to the X-INTRAM, though the doorbells can contain comparatively more information. The DPI ports of the virtual logic write the outgoing messages into the SINTRAM locations and the virtual logic writes the corresponding doorbells into the doorbell messages of the XINTRAM. In many cases, one-bit doorbells simply indicate to the traffic processor that there are memory addresses (e.g., SINTRAMs) containing queued outgoing messages. The doorbell could, however, contain more information to indicate multiple memory locations containing the portions (e.g., the outgoing messages) of an amalgamated message. The DPI ports producing the amalgamated message write the outgoing messages into the memory locations. The doorbell indicates, for example, each of the memory locations, the length of the amalgamated message, the header information at the start of the amalgamated message, or other information that informs the traffic processor and/or the DMA engines how to identify and assemble the outgoing messages of the amalgamated message.

Additionally or alternatively, the virtual logic logically combines or organizes two or more DPI ports into an amalgamated DPI port. For each amalgamated DPI port, the virtual logic calculates write addresses for the outgoing messages intended for the underlying DPI ports and concatenates these outgoing messages to generate the amalgamated message. The emulation processors (executing the virtual logic) write the amalgamated messages to the SINTRAM locations corresponding to the amalgamated DPI ports.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for handling outgoing messages from an emulator executing virtual logic, the method comprising:
   generating, by an emulator, one or more outgoing messages for a host device according to virtual logic wherein the one or more outgoing messages are direct programming interface (DPI) messages;
   storing, by the emulator, the one or more outgoing messages into a memory of one or more memories;
   identifying, by the emulator, a memory location of the memory containing an outgoing message; and
   transmitting, by the emulator, the outgoing message at the memory location to the host device.

2. The method according to claim 1, further comprising transmitting a direct memory access (DMA) request to a DMA engine in response to identifying the memory location containing the outgoing message, the DMA request indicating the memory location for the DMA engine and instructing the DMA engine to transmit the outgoing message to the host device.

3. The method according to claim 1, further comprising:
   determining, by a DMA engine, based upon information of a header of the outgoing message that the outgoing message has a length that exceeds a threshold length;
   removing, by the DMA engine, a portion of the outgoing message based upon the threshold length; and
   storing, by the DMA engine, the outgoing message into an I/O buffer memory, wherein the emulator transmits the outgoing message to the host system from the I/O buffer memory.

4. The method according to claim 1, further comprising outputting, by one or more emulation processors according to the virtual logic, the one or more outgoing messages to one or more corresponding memory locations of the memory according to one or more DPI ports of the virtual logic.

5. The method according to claim 4, further comprising:
   generating, by the one or more emulation processors, an amalgamated message by combining a set of one or more outgoing messages from a particular DPI port;
   generating, by the one or more emulation processors, a notification message corresponding to the amalgamated message; and
   storing, by the one or more emulation processors, the notification message into a second memory accessible to a traffic processor, the notification message indicating one or more memory locations containing the amalgamated message in the second memory.

6. The method according to claim 4, wherein the virtual logic includes one or more amalgamated DPI ports, each amalgamated DPI port comprising a subset of the DPI ports, the method further comprising:
   generating, by the emulation processors executing the virtual logic of an amalgamated DPI port, an amalgamated messaged by combining a set of one or more outgoing messages according to the virtual logic for the subset of DPI ports.

7. The method according to claim 1, further comprising:
   generating, by one or more emulation processors according to the virtual logic, one or more notification messages associated with the one or more outgoing messages;
   storing, by the emulator, the one or more notification messages into one or more corresponding registers of a second memory according to one or more DPI ports of the virtual logic; and
   determining, by a traffic processor, the memory location of the memory containing the outgoing message according to the notification message, wherein the emulator identifies the memory location containing the outgoing message as determined by the traffic processor.

8. The method according to claim 1, wherein a traffic processor causes the one or more outgoing messages to be transmitted to one or more buffer memories of a data processing unit of the emulator, the method further comprising:
   identifying, by the data processing unit, the outgoing message in a buffer memory of the data processing unit; and
   transmitting, by the data processing unit, the outgoing message to the host device via a communication link.

9. The method according to claim 1, further comprising assembling, by a data processing unit of the emulator, an amalgamated message from a plurality of outgoing messages stored in a plurality of memory buffers of the data processing unit.

10. The method according to claim 1, further comprising polling, by the emulator, one or more registers of the second memory to detect a notification message stored in a register of the second memory.

11. The method according to claim 1, wherein the traffic processor is further configured to poll one or more registers of the second memory to detect the notification message stored in a register of the second memory.

12. An emulator system comprising:
a plurality of emulation processors configured to:
execute virtual logic of a compiled design; and
generate one or more outgoing messages for a host device according to virtual logic wherein the one or more outgoing messages are direct programming interface (DPI) messages;
a memory of one or more memories configured to store the one or more outgoing messages generated by the plurality of emulation processors; and
a traffic processor configured to:
identify a memory location of the memory containing an outgoing message according to a notification message; and
transmit the outgoing message to the host device.

13. The system according to claim 12, further comprising a direct memory access (DMA) engine configured to manage data transfers from a plurality of memory locations of the memory to the host device according to a DMA request; and
wherein the traffic processor is configured to transmit the DMA request to the DMA engine in response to identifying the memory location of the second memory containing the outgoing message, the DMA request indicating the memory location for the DMA engine and instructing the DMA engine to transmit the outgoing message to the host device.

14. The system according to claim 12, further comprising a DMA engine configured to:
determine based upon information in a header of the outgoing message that the outgoing message has a length that exceeds a threshold length;
remove a portion of the outgoing message based upon the threshold length; and
store the outgoing message into an I/O buffer memory, wherein the emulator transmits the outgoing message to the host system from the I/O buffer memory.

15. The system according to claim 12, wherein the plurality of emulation processors are further configured to output the one or more outgoing messages to one or more corresponding memory locations of the memory according to one or more DPI ports of the virtual logic.

16. The system according to claim 15, wherein the plurality of emulation processors are further configured to:
generate an amalgamated message by combining a set of one or more outgoing messages from a particular DPI port;
generate a notification message corresponding to the amalgamated message; and
store the notification message into a second memory accessible to the traffic processor, the notification message indicating one or more memory locations containing the amalgamated message in the second memory.

17. The system according to claim 15, wherein the virtual logic includes one or more amalgamated DPI ports, each amalgamated DPI port comprising a subset of the DPI ports, and
wherein the plurality of emulation processors are configured to:
execute the virtual logic of an amalgamated DPI port; and
generate an amalgamated messaged by combining a set of one or more outgoing messages according to the virtual logic for the subset of DPI ports.

18. The system according to claim 12, further comprising a second memory comprising one or more registers configured to store one or more notification messages associated with the one or more outgoing messages,
wherein the plurality of emulation processors are further configured to:
generate the one or more notification messages according to the virtual logic;
store the one or more notification messages into the one or more corresponding registers of the second memory according to one or more DPI ports of the virtual logic; and
wherein the traffic processor is further configured to:
determine the memory location of the memory containing the outgoing message according to the notification message to identify the memory location containing the outgoing message.

19. The system according to claim 12, further comprising a data processing unit having a plurality of buffer memories in communication with a plurality of emulation chips,
wherein the traffic processor causes the one or more outgoing messages to be transmitted to one or more buffer memories of the data processing unit, and
wherein the data processing unit is configured to identify the outgoing message in a buffer memory, and transmit the outgoing message to the host device via a communication link.

20. The system according to claim 12, further comprising a data processing unit in communication with a plurality of emulation chips, the data processing unit configured to assemble an amalgamated message from a plurality of outgoing messages stored in a plurality of memory buffers of the data processing unit.

* * * * *